UNITED STATES PATENT OFFICE.

LEOPOLD BRANDEIS, OF BROOKLYN, NEW YORK.

MODE OF PROTECTING LEAD PIPE AGAINST THE ACTION OF WATER.

Specification forming part of Letters Patent No. 41,675, dated February 23, 1864.

*To all whom it may concern:*

Be it known that I, LEOPOLD BRANDEIS, of Brooklyn, county of Kings, and State of New York, have invented a new and Improved Mode of Protecting Lead Pipe or Lead Vessels against the Action of Water; and I do hereby declare that the following is a full and exact description thereof.

The nature of my invention consists in producing an insoluble sulphide of lead inside such pipe or vessel to be protected against the action of water.

To enable others skilled in the art of making lead pipe to make use of my invention, I will proceed to describe my process.

I generate sulphide of hydrogen by the usual and generally known materials and apparatus, and discharge this combination of sulphur and hydrogen into such lead pipe and lead vessel to be protected, and after it has given off sufficient sulphur to form sulphide of lead for the purpose aforesaid into a chimney.

What I claim as my invention, and desire to secure by Letters Patent, is—

The application of hydrogen or any other gas, in combination with sulphur, for the purpose of producing a sulphide of lead on which water cannot act, and thereby do away with any danger of lead-poisoning, even if water should be kept standing in such pipe or vessel.

LEOPOLD BRANDEIS.

Witnesses:
M. FOSTER,
CHAS. E. FROST.